(12) United States Patent
Cha et al.

(10) Patent No.: US 9,174,584 B1
(45) Date of Patent: Nov. 3, 2015

(54) BICYCLE CARRIER FOR VEHICLE

(71) Applicant: Hyundai Motor Company, Seoul (KR)

(72) Inventors: Dong Eun Cha, Suwon-si (KR); Phil Jung Jeong, Yongin-si (KR); Hyun Gyung Kim, Hwaseong-si (KR); Seung Mok Lee, Osan-si (KR); Soo Hyun Hyun, Gyeongju-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/525,778

(22) Filed: Oct. 28, 2014

(30) Foreign Application Priority Data

Jun. 19, 2014 (KR) .................. 10-2014-0075170

(51) Int. Cl.
  *B60R 9/10* (2006.01)
  *B60R 19/48* (2006.01)
  *B60R 9/06* (2006.01)

(52) U.S. Cl.
  CPC . *B60R 9/10* (2013.01); *B60R 19/48* (2013.01); *B60R 9/06* (2013.01)

(58) Field of Classification Search
  CPC .......... B60R 9/10; B60R 9/06; Y10S 224/924
  USPC ......... 224/489, 491, 496, 497, 510, 512, 516, 224/523, 529, 924
  See application file for complete search history.

(56) References Cited

U.S. PATENT DOCUMENTS

| | | | | |
|---|---|---|---|---|
| 1,572,815 A | * | 2/1926 | Schultz ........................ | 224/491 |
| 1,585,871 A | * | 5/1926 | Pels .............................. | 224/497 |
| 1,886,911 A | * | 11/1932 | Schulman ..................... | 224/491 |
| 3,251,520 A | * | 5/1966 | Van Dyke et al. ............ | 224/510 |
| 5,445,300 A | * | 8/1995 | Eipper et al. ................. | 224/496 |
| 7,909,213 B2 | * | 3/2011 | Bergerhoff et al. .......... | 224/197 |
| 7,992,751 B1 | * | 8/2011 | Sweeney ....................... | 224/497 |
| 2007/0090142 A1 | * | 4/2007 | Chuang ......................... | 224/496 |
| 2010/0001029 A1 | * | 1/2010 | Tai ................................ | 224/499 |

FOREIGN PATENT DOCUMENTS

| | | |
|---|---|---|
| JP | 2008-13177 A | 1/2008 |
| KR | 1998-018829 U | 7/1998 |
| KR | 10-2011-0034733 A | 4/2011 |
| KR | 10-2011-0035378 A | 4/2011 |
| KR | 10-2011-0050162 A | 5/2011 |

\* cited by examiner

*Primary Examiner* — Brian D Nash
*Assistant Examiner* — Corey Skurdal
(74) *Attorney, Agent, or Firm* — Morgan, Lewis & Bockius LLP

(57) ABSTRACT

A bicycle carrier for a vehicle may include guide rails symmetrically disposed at both sides of a rear bumper beam and extending in a front-rear direction of the vehicle, a sliding rail including a panel and sides extending from the panel, and sliding forward and backward on the guide rails, an expanding link disposed between the sides of the sliding rails and including a plurality of links connected such that a lateral gap between the links increases, when a front-rear gap between the links decreases, support arms disposed on the expanding link to move laterally with the expanding link, slidably engaged with the sliding rails, and fixing a loaded bicycle, and an actuating unit fixed to the rear bumper beam, including a link assembly connected to the sliding rail and the expanding link, and providing power through the link assembly during operation to move the sliding rail and expand or contract the expanding link.

9 Claims, 4 Drawing Sheets

BICYCLE CARRIER FOR VEHICLE

CROSS-REFERENCE TO RELATED APPLICATION

The present application claims priority to Korean Patent Application No. 10-2014-0075170 filed Jun. 19, 2014, the entire contents of which is incorporated herein for all purposes by this reference.

BACKGROUND OF THE INVENTION

1. Field of the Invention

The present invention relates, in general, to a carrier for loading a bicycle on a vehicle, and, more particularly, to a bicycle carrier for a vehicle which is stowed in a rear bumper beam when not in use, but is drawn out to load a vehicle.

2. Description of Related Art

Recently, as people use bicycles for leisure activities, they load bicycles on vehicles to carry them around bicycle-only roads or mountains.

However, bicycles are generally large in volume, so they are difficult to load even using the trunk or the backseat space of vehicles.

Although various methods of loading a bicycle on the outer surfaces of vehicles have been proposed to solve the problem, the manner of loading and fixing a bicycle on the roof panel of a vehicle not only makes loading itself very inconvenient, but increases the height of the vehicle, such that it may cause a safety accident due to the bicycle being caught on a tunnel or a building, when the vehicle enters the structures.

In the case of a bicycle mounted on the tailgate of a vehicle, complex installation is required for a specific carrier device, and the carrier device remains visible even when there is no bicycle mounted thereon, thereby detracting from the external appearance of the vehicle.

Further, it is troublesome to install the carrier device in order to load a bicycle and to remove the carrier device, when there is no need for usage, thus decreasing convenience.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a bicycle carrier for a vehicle which is disposed inside a rear bumper beam of a vehicle, is not exposed to the outside when not in use, and can keep the external appearance of the vehicle and improve convenience by drawing out of a rear bumper beam so that a bicycle can be loaded, when the bicycle loading is desired.

According to various aspects of the present invention, a bicycle carrier for a vehicle may include guide rails symmetrically disposed at both sides of a rear bumper beam and extending in a front-rear direction of the vehicle, a sliding rail including a panel and sides extending from the panel, and sliding forward and backward on the guide rails, an expanding link disposed between the sides of the sliding rails and including a plurality of links connected such that a lateral gap between the links increases, when a front-rear gap between the links decreases, support arms disposed on the expanding link to move laterally with the expanding link, slidably engaged with the sliding rails, and fixing a loaded bicycle, and an actuating unit fixed to the rear bumper beam, including a link assembly connected to the sliding rail and the expanding link, and providing power through the link assembly during operation to move the sliding rail and expand or contract the expanding link.

The actuating unit may include a motor assembly providing torque, and the link assembly may include a first link extending from the motor assembly to the sides of the sliding rail and having both ends connected to the guide rail and a second link extending from the motor assembly, perpendicular to the panel of the sliding rail, and connected to the expanding link.

The motor assembly may include a first motor connected to the first link and a second motor connected to the second link.

A pinion gear may be disposed at both ends of the first link, the sliding rail may have rack gears extending in the front-rear direction along the sliding rail, and the rack gears may be engaged with the pinion gears.

The expanding link may include a pair of two-bar linkages that are symmetric to each other with the second link positioned therebetween, and first ends and second ends of the pair of two-bar linkages may be pivotably connected to the second link, each of the first ends and each of the second ends overlapping each other, respectively, and the first ends and the second ends may be spaced from each other by a gap.

The second link may be a lead screw and the first ends and the second ends of the pair of two-bar linkages may be connected to the second link through lead nuts, such that as the second link rotates, the first ends and the second ends move in opposite directions from each other in an axial direction of the second link.

The expanding link may have support arms connected to pivot points between the first ends and the second ends of the two-bar linkages of the expanding link, and the support arms may be connected to the pivot points of the two-bar linkages and each support arm may include a moving arm extending from the pivot point to a predetermined distance in the front-rear direction and fixing arms disposed at both ends of the moving arm, laterally extending, and supported over the sliding rail.

Guide projections supporting sides of the fixing arms of the support arms may be formed on top of the sliding rail.

A fixing bar for fixing a bicycle loaded on the support arms may be rotatably coupled to the sliding rail.

According to the bicycle carrier for a vehicle which has the structure described above, the bicycle carrier is installed inside the rear bumper beam at the rear of a vehicle, so it is not exposed to the outside when not in use, but automatically slides out from the rear bumper beam to load a vehicle, and therefore, the external appearance is maintained and convenience is also improved.

Further, in the process of the deployment of the bicycle carrier, since the carrier slides out first and then the parts where a bicycle is loaded laterally extend, commercial value is also improved.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
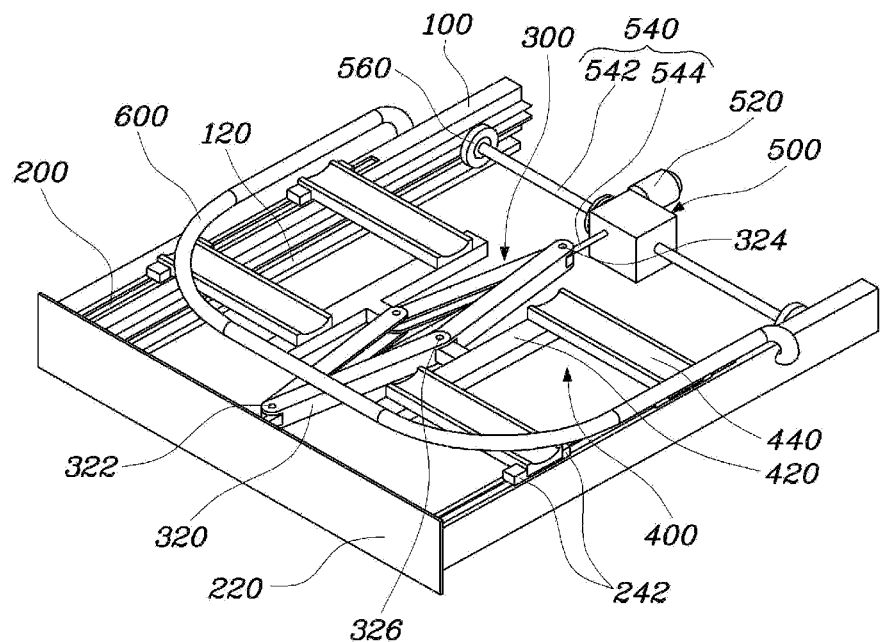
FIG. 1 is a perspective view of an exemplary bicycle carrier for a vehicle according to the present invention.
Figure 2:
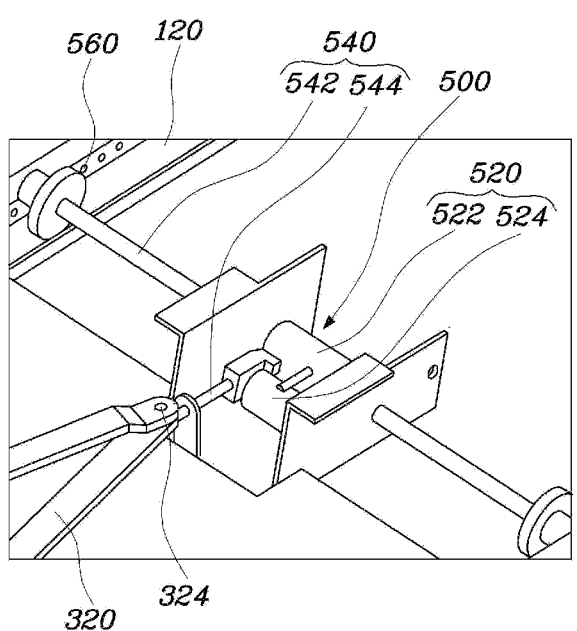
FIG. 2, FIG. 3 and FIG. 4 are views illustrating the exemplary bicycle carrier for the vehicle shown in FIG. 1.
Figure 3:
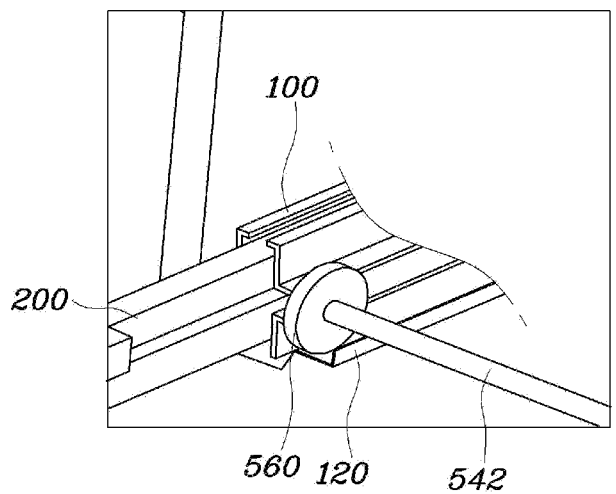
Figure 4:
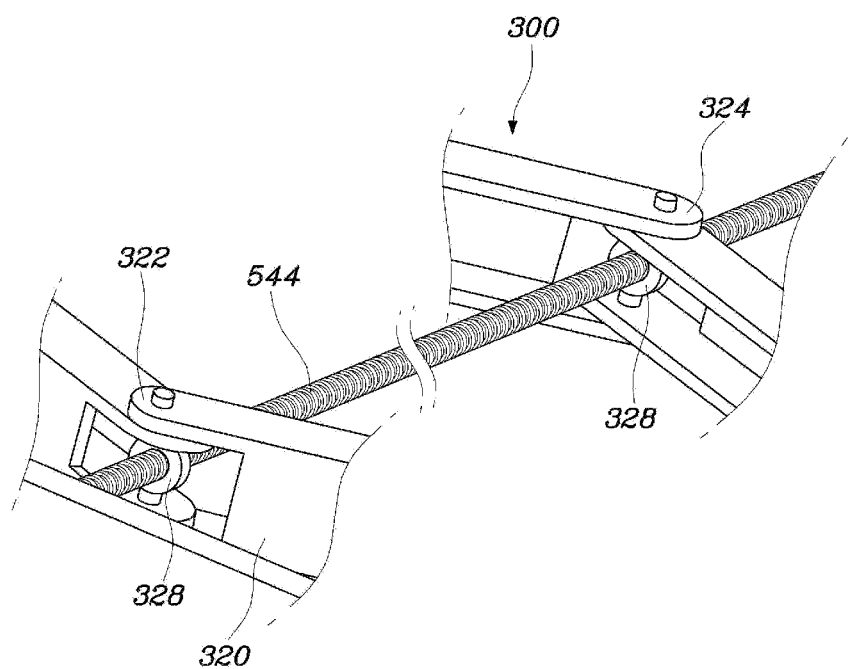

FIG. 1 is a perspective view of bicycle carrier for a vehicle according to various embodiments of the present invention and FIG. 2, FIG. 3 and FIG. 4 are views showing components of the bicycle carrier for a vehicle shown in FIG. 1 in detail.

A bicycle carrier of the present invention includes guide rails 100 that are symmetrically disposed at both sides of a rear bumper beam 10 and extend in the front-rear direction, a sliding rail 200 that has a panel 220 and sides 240 extending from the panel 220 and can slide forward/backward on the guide rails 100, an expanding link 300 that is disposed between the sides 240 of the sliding rails 200 and is composed of a plurality of links connected such that the lateral gap increases, when the front-rear gap decreases, support arms 400 that are disposed on the expanding link 300 to move laterally with the expanding link 300, supported over the sliding rails 200, and fix a loaded bicycle to a vehicle, and an actuating unit 500 that is fixed to the rear bumper beam 10, includes a link assembly 540 connected to the sliding rail 200 and the expanding link 300, and transmits power through the link assembly 540 in operation to enable the sliding rail 200 and the expanding link 300 to move and expand, respectively.

The bicycle carrier of the present invention may be installed inside the rear bumper beam 10 at the rear of a vehicle and may be disposed to be drawn out from the rear bumper beam 10 or from under the rear bumper beam 10.

In the present invention, the bicycle carrier is drawn out from the rear bumper beam 10, which minimizes deterioration of the external appearance and exposure to the outside to prevent a breakdown due to inflow of foreign substances.

The guide rails 100 are fixed symmetrically at both sides inside the rear bumper beam 10, extending in the front-rear direction of a vehicle. That is, the carrier is drawn out or stowed inside by sliding from and along the guide rails 100.

The sliding rail 200 has the panel 220 making the same surface with the rear bumper beam 10 and the sides 240 extending from the panel 220 are disposed inside the guide rails 100. That is, as the sliding rail 200 combined with the guide rails 100 moves along the guide rails 100, the carrier is drawn out or in.

The expanding link 300 is disposed between the sides 240 of the sliding rail 200 in the present invention. The expanding link 300 is composed of a plurality of links, which are connected such that the side gap increases, when the front-rear gap decreases, thereby expanding. That is, as shown in FIG. 1, a plurality of links are connected in a diamond shape, such that when the distance between the front-rear apexes increases, the distance between the side apexes decreases, and when the distance between the front-rear apexes decreases, the distance between the side apexes increases, thereby expanding.

The support arms 400 are coupled to the expanding link 300, and they move laterally with the expanding link 300, when the expanding link 300 laterally expands. The support arms 400 enable a loaded bicycle to be fixed.

The sliding rail 200 and the expanding link 300 are moved and expanded, respectively, by power from the actuating unit 500. The actuating unit 500 has the link assembly 540 connected to the sliding rail 200 and the expanding link 300, so when the actuating unit 500 is operated, power is transmitted to the link assembly 540 connected to the sliding rail 200 and the expanding link 300 to move the sliding rail 200 or the expanding link 300.

The detailed connection relationship between the guide rail 100 and the expanding link 300, which slides out and expands, respectively, when the actuating unit 500 is operated, will be described in detail below.

As shown in FIG. 2, the actuating unit 500 includes a motor assembly 520 that provides torque and the link assembly 540 is composed of a first link 542 extending from the motor assembly 520 to both sides 240 of the sliding rail 200 and having both ends connected to the guide rails 100 and a second link 544 extending from the motor assembly 520, perpendicular to the panel 220 of the sliding rail 200, and connected with the expanding link 300.

The motor assembly 520 may include a first motor 522 connected to the first link 542 and a second motor 524 connected to the second link 544. In the present invention, the rotational directions of the first link 542 moving the sliding rail 200 and the second link 544 expanding the expanding link 300 are different from each other, so the motor assembly 520 can be divided into the first motor 522 and the second motor 524.

In addition to using a plurality of motors, for providing torque in different directions, one motor may be used to selectively connect a driven shaft, which transmits torque, to the first link 542 and the second link 544 by changing the length of the driven shaft.

The structure, in which the sliding rail 200 moves, when power is applied from the actuating unit 500, is described first. As shown in FIG. 3, a pinion gear 560 is disposed at both ends of the first link 542 and the sliding rail 200 has rack gears 120 extending in the front-rear direction along the sliding rail 200 in mesh with the pinion gear 560.

That is, the sliding rail 200 has the rack gears 120 extending in the front-rear direction and the pinion gears 560 are disposed on the first link 542 extending from the motor assembly 520, in mesh with the rack gear 120, such that as the motor assembly 520 operates, the first link 542 rotates and the pinion gear 560 rotates with the rotation of the first link 542, and accordingly, the sliding rail 200 connected with the rack gears 120 moves.

Further, the guide rails 100 may be further provided with a solenoid selectively allowing the sliding rail 200 to slide out by being selectively connected to the sliding rail 200. The solenoid may operate in conjunction with the motor assembly 520 so that when the carrier is needed, electricity is applied to the solenoid and the sliding rail 200 is unlocked and then the motor assembly 520 is operated to move the sliding rail 200.

When the sliding rail 200 is drawn out to be exposed to the outside, the expanding link 300 operates and a bicycle can be loaded on the support arms 400.

In detail, as shown in FIGS. 1 and 4, the expanding link 300 is composed of a pair of two-bar linkages 320 that are symmetric to each other with the second link 544 therebetween and first ends 322 and second ends 324 of the pair of two-bar linkages 320 are pivotably connected to the second link 544, overlapping each other, respectively, in which the first end 322 and the second end 324 may be spaced from each other by a predetermined gap.

That is, since the first ends 322 and the second ends 324 of the pair of two-bar linkage 320 symmetrically disposed with the second link 544 therebetween are connected to the second link 544, overlapping each other, respectively, the expanding link 300 forms a diamond shape. The first ends 322 and the second ends 324 of the two-bar linkages 320 are connected to the second link 544 and pivot points 326 of the two-bar linkages 320 can pivot, such that the first ends 322 and the second ends 324 of the two-bar linkages 320 come closer to each other, the distance between the pivot points 326 increases, and therefore, the expanding link 300 expands to the left and right.

Since the pair of two-bar linkages 320 are connected, the expanding link 300 has sufficient supporting ability and durability, so it can stably support a load, when a bicycle is loaded.

As for the detailed connection relationship between the expanding link 300 and the second link 544, the second link 544 may be a lead screw and the first ends 322 and the second ends 324 of the pair of two-bar linkages 320 are connected to the second link 544 through nuts 328, which may be made of lead, such that as the second link 544 rotates, the first ends 322 and the second ends 324 can move in opposite directions of each other, that is, either towards or away from each other in the axial direction of the second link 544.

As described above, since the second link 544 may be a lead screw and the first ends 322 and the second ends 324 of the pair of two-bar linkages 320 are connected to the second link 544 through the nuts 328 which may be made of lead, as the second link 544 is rotated by the motor assembly 520, the nuts 328 to which the two-bar linkages 320 are connected move and the first ends 322 and the second ends 324 of the two-bar linkages 320 can move accordingly.

In the present invention, however, the two-bar linkages 320 are supposed to move in opposite directions so that the expanding link 300 expands or contracts. To this end, the second link 544 has opposite threads on a portion on which the nut 328 connected with the first ends 322 of the two-bar linkages 320 moves and the portion on which the nut 328 connected with the second ends 324 moves, and accordingly, the nut 328 connected with the first ends 322 of the two-bar linkages 320 and the nut 328 connected with the second ends 324 can move in opposite directions, even though the second link 544 rotates in one direction.

Therefore, since the first ends 322 and the second ends 324 of the two-bar linkages 320 of the expanding link 300 move in opposite directions, even though the second link 544 rotates in one direction, as the first ends 322 and the second ends 324 are moved close to each other by the motor 520, the pivot points 326 of symmetric two-bar linkages 320 move away from each other, thereby expanding the expanding link 300, and as the first ends 322 and the second ends 324 move away from each other, the pivot points 326 of symmetric two-bar linkages 320 move close to each other, thereby contracting the expanding link 300.

The support arms 400 are connected to the pivot points 326 between the first ends 322 and the second ends 324 of the two-bar linkages 320 of the expanding link 300. The support arms 400 are connected to the pivot points 326 of the two-bar linkages 320 and each may include a moving arm 420 extending to a predetermined distance in the front-rear direction and fixing arms disposed at both ends of the moving arm 420, laterally extending, and supported over the sliding rail 200.

That is, the support arms 400 are connected to the pivot points 326 of the two-bar linkages 320 of the expanding link 300, and accordingly, as the expanding link 300 expands, the support arms 400 laterally move.

The support arms 400 are each composed of the moving arm 420 connected to the pivot point 326 and the fixing arms 440 on each end of the moving arm. In particular, since the fixing arms 440 extend toward the sliding rail and are supported over the sliding rail 200, when the expanding link 300 expands and contracts, the fixing arms 440 are prevented from failing to operate due to being blocked by the sliding rail 200 and sufficient supporting ability is ensured.

The tops of the fixing arms 440, where the wheels of a bicycle are placed, may be curved and the wheels of a bicycle can be firmly fixed to the fixing arms 440 by specific fixing members.

Guide projections 242 supporting the sides of the fixing arms 440 of the support arms 400 may be formed on the top of the sliding rail 200.

The guide projections 242 prevent movement of the fixing arms 440 of the support arms 400 supported over the sliding rail 200, except for lateral movement, for stable loading of a bicycle and the fixing arms 440 move only between the guide projections 242, when the expanding link 300 expands and contracts, thereby achieving smooth operation.

A fixing bar 600 for fixing a bicycle loaded on the support arms 400 may be rotatably coupled to the sliding rail 200.

That is, the fixing bar 600 is folded over the sliding rail 200 when not in use, but in order to load a bicycle, it can be turned up and then fixed to the body of a bicycle loaded on the support arm 400, such that the loaded bicycle can be more firmly fixed.

The fixing bar 600 coupled to the sliding rail 200 may keep the turning positions by a specific solenoid or a holding member. That is, the fixing bar 600 may be connected with a motor to be automatically turned. The holding member may be implemented in various ways such as a locking lever, a latch, and a motor.

Figure 5:
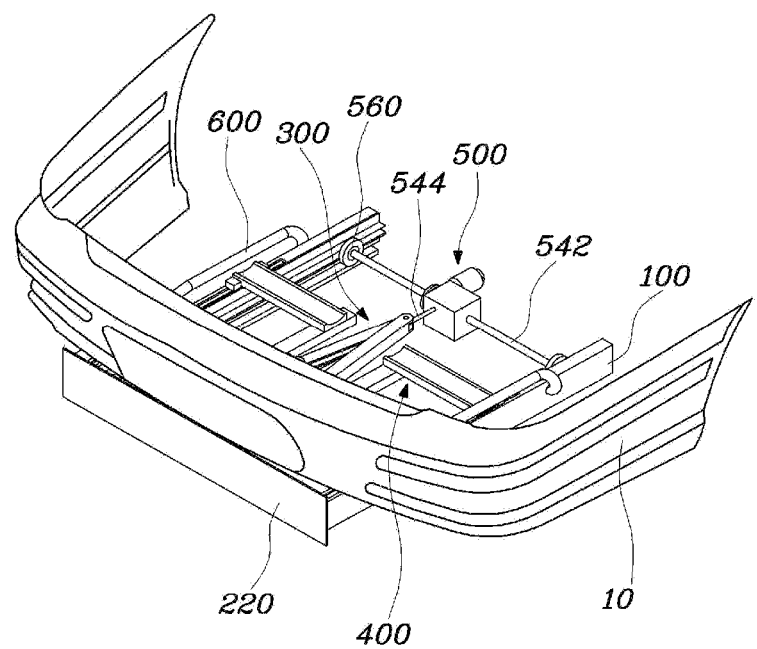
FIG. 5, FIG. 6, FIG. 7 and FIG. 8 are views illustrating an operational state of the exemplary bicycle carrier for the vehicle shown in FIG. 1.

The operation of the carrier for a vehicle of the present invention described above is described with reference to FIG. 5, FIG. 6, FIG. 7 and FIG. 8, and as shown in FIG. 5, the carrier is stored inside the rear bumper beam 10, not to be exposed to the outside, when not in use.

In order to load a bicycle, a user activates the motor assembly 520 through a specific switch. The switch may be provided at the tail gate or around the driver's seat. In this process, the motor assembly 520 rotates only the first link 542.

Figure 6:
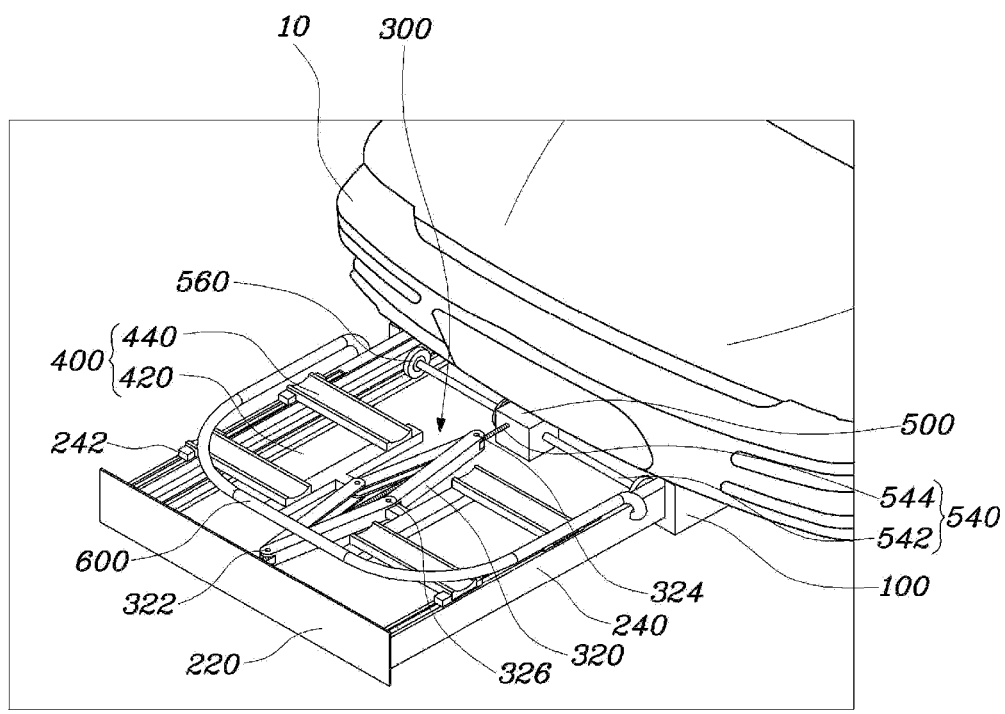

As shown in FIG. 6, when the motor assembly 520 operates, the first link 542 rotates first and the pinion gears 560 rotate, and the rack gears 120 engaged with the pinion gears 560 move, such that the sliding rail 200 moves rearward from the vehicle along the guide rails 100.

Figure 7:
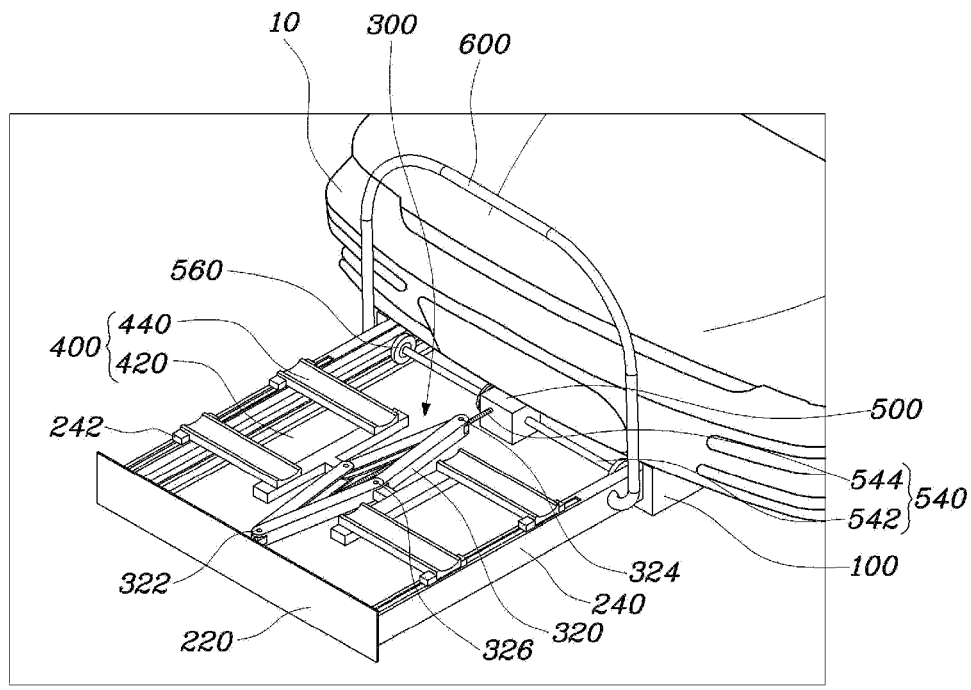

When the sliding rail 200 moves rearward and slides out, the user turns up the fixing bar so that a bicycle can be loaded, as shown in FIG. 7.

Figure 8:
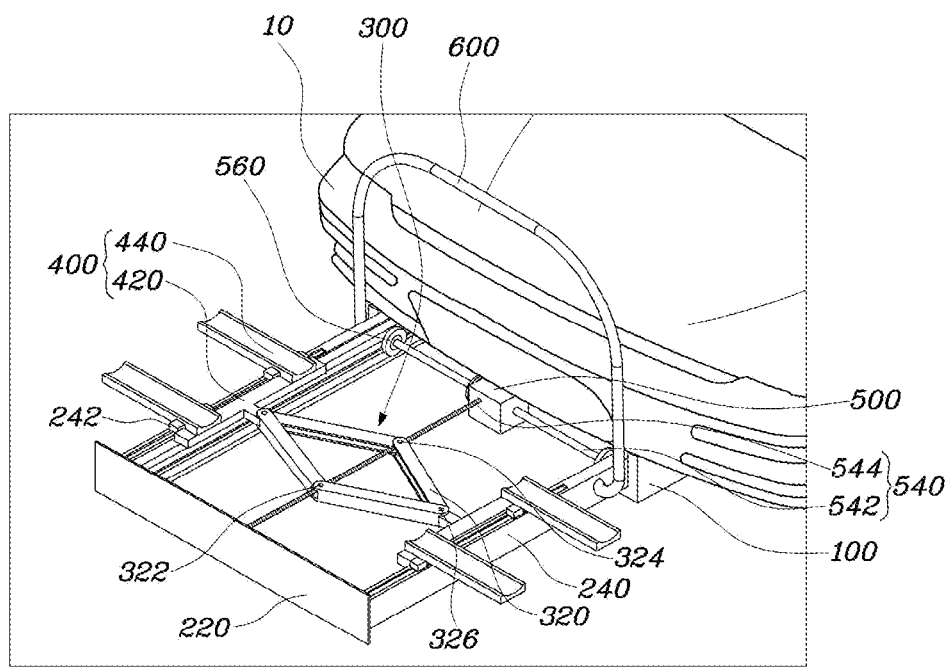

When the sliding rail 200 fully slides out from the rear bumper beam 10, the motor assembly 520 is operated to stop rotation of the first link 542 and rotate the second link 544, such that the first ends 322 and the second ends 324 of the two-bar linkages 320 of the expanding link 300 move along the second link 544. That is, as the first ends 322 and the second ends 324 of the two-bar linkages 320 move close to each other, the pivot points 326 of the symmetric two-bar linkages 320 move away from each other, and as shown in FIG. 8, the support arms 400 connected to the pivot points 326 move to the left and right, such that a bicycle can be loaded.

The carrier can be stowed in the opposite order of this process.

According to the bicycle carrier for a vehicle which has the structure described above, the bicycle carrier is installed inside the rear bumper beam 10 at the rear of a vehicle, so it is not exposed to the outside when not in use, but automatically slides out from the rear bumper beam 10 to load a bicycle, and therefore, the external appearance is maintained and convenience is also improved.

Further, in the process of the deployment of the bicycle carrier, since the carrier slides out first and then the parts where a bicycle is loaded laterally extend, commercial value is also improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bicycle carrier for a vehicle, comprising:
    guide rails symmetrically disposed at both sides of a rear bumper beam and extending in a front-rear direction of the vehicle;
    a sliding rail including a panel and sides extending from the panel, and sliding forward and backward on the guide rails;
    an expanding link disposed between the sides of the sliding rail and including a plurality of links connected such that a lateral gap between the links increases, when a front-rear gap between the links decreases;
    support arms disposed on the expanding link to move laterally with the expanding link, slidably engaged with the sliding rails, and fixing a loaded bicycle; and
    an actuating unit fixed to the rear bumper beam, including a link assembly connected to the sliding rail and the expanding link, and providing power through the link assembly during operation to move the sliding rail and expand or contract the expanding link.

2. The bicycle carrier of claim 1, wherein the actuating unit includes a motor assembly providing torque, and the link assembly includes a first link extending from the motor assembly to the sides of the sliding rail and a second link extending from the motor assembly, perpendicular to the panel of the sliding rail, and connected to the expanding link.

3. The bicycle carrier of claim 2, wherein the motor assembly includes a first motor connected to the first link and a second motor connected to the second link.

4. The bicycle carrier of claim 2, wherein a pinion gear is disposed at both ends of the first link, the sliding rail has rack gears extending in the front-rear direction along the sliding rail, and the rack gears are engaged with the pinion gears.

5. The bicycle carrier of claim 2, wherein the expanding link includes a pair of two-bar linkages that are symmetric to each other with the second link positioned therebetween, and
    first ends and second ends of the pair of two-bar linkages are pivotably connected to the second link, each of the first ends and each of the second ends overlapping each other, respectively, and the first ends and the second ends are spaced from each other by a gap.

6. The bicycle carrier of claim 5, wherein the second link is a lead screw and the first ends and the second ends of the pair of two-bar linkages are connected to the second link through lead nuts, such that as the second link rotates, the first ends and the second ends move in opposite directions from each other in an axial direction of the second link.

7. The bicycle carrier of claim 5, wherein the expanding link has the support arms connected to pivot points between the first ends and the second ends of the two-bar linkages of the expanding link, and
    each support arm includes a moving arm extending from the pivot point to a predetermined distance in the front-rear direction and fixing arms disposed at both ends of the moving arm, laterally extending, and supported over the sliding rail.

8. The bicycle carrier of claim 7, wherein guide projections supporting sides of the fixing arms of the support arms are formed on top of the sliding rail.

9. The bicycle carrier of claim 1, wherein a fixing bar for fixing a bicycle loaded on the support arms is rotatably coupled to the sliding rail.

* * * * *